(12) United States Patent
Eun et al.

(10) Patent No.: US 7,807,310 B2
(45) Date of Patent: Oct. 5, 2010

(54) END PLATE FOR FUEL CELL STACK AND AIR BREATHING FUEL CELL STACK USING THE SAME

(75) Inventors: Yeong-chan Eun, Suwon-si (KR); Jun-ho Sauk, Suwon-si (KR); Seong-jin An, Suwon-si (KR); Gill-tae Roh, Suwon-si (KR); Seok-rak Chang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 218 days.

(21) Appl. No.: 12/034,060

(22) Filed: Feb. 20, 2008

(65) Prior Publication Data
US 2008/0280183 A1  Nov. 13, 2008

(30) Foreign Application Priority Data
May 8, 2007  (KR)  ........................ 10-2007-0044598

(51) Int. Cl.
*H01M 2/00* (2006.01)
(52) U.S. Cl. .................. 429/452; 429/546; 429/547; 429/548; 429/463; 429/517
(58) Field of Classification Search .................. 428/32, 428/34, 38; H01M 8/10, 8/24
See application file for complete search history.

(56) References Cited

U.S. PATENT DOCUMENTS

| | | | |
|---|---|---|---|
| 2003/0152819 A1 | 8/2003 | Hatoh et al. | |
| 2003/0180594 A1* | 9/2003 | Choi et al. | 429/32 |
| 2005/0031926 A1* | 2/2005 | Sugimasa et al. | 429/30 |
| 2005/0202297 A1* | 9/2005 | Schmitz et al. | 429/32 |
| 2006/0124346 A1 | 6/2006 | Shu et al. | |
| 2008/0152980 A1* | 6/2008 | Yokoi | 429/30 |

FOREIGN PATENT DOCUMENTS

| | | |
|---|---|---|
| JP | 2003-187817 | 7/2003 |
| KR | 2003-3560 | 1/2003 |
| KR | 2003-75755 | 9/2003 |
| WO | WO 02/41424 A1 | 5/2002 |

OTHER PUBLICATIONS

Office Action issued by Korean Intellectual Property Office in Korean Patent Application No. 2007-44598 on Jun. 24, 2008.

* cited by examiner

*Primary Examiner*—Jennifer K Michener
*Assistant Examiner*—Heng M Chan
(74) *Attorney, Agent, or Firm*—Christie, Parker & Hale, LLP

(57) ABSTRACT

An end plate of an air breathing fuel cell stack and an air breathing fuel cell stack including the same. The air breathing fuel cell stack includes a membrane electrode assembly, including an anode electrode, a cathode electrode, and an electrolyte positioned between the anode electrode and the cathode electrode; and an end plate contacting the membrane electrode assembly. The end plate includes a first surface contacting the membrane electrode assembly, an opposing second surface; and a collector positioned at the first surface and contacting the cathode electrode.

15 Claims, 4 Drawing Sheets

END PLATE FOR FUEL CELL STACK AND AIR BREATHING FUEL CELL STACK USING THE SAME

CROSS-REFERENCE TO RELATED APPLICATION

This application claims the benefit of Korean Application No. 2007-44598, filed May 8, 2007, in the Korean Intellectual Property Office, the disclosure of which is incorporated herein by reference.

BACKGROUND OF THE INVENTION

1. Field of the Invention

Aspects of the present invention relate to an air breathing fuel cell stack, and an end plate adopted in the stack, capable of simplifying and thinning a system.

2. Description of the Related Art

Mobile devices, such as, a cellular phone, an MP3 player, a portable multimedia player (PMP), and a notebook computer, etc., are widely used. However, more compact and higher-performance mobile device are in demand. At present, mobile devices are not supplied with sufficient power to support advanced functions, such as, multimedia communication, and digital multimedia broadcasts, etc.

At present, most mobile devices use a lithium ion battery as a main power supply. When a lithium ion battery is charged once, it has an average useable operating time of six hours, in a notebook computer, and about two to three days in a cellular phone. However, since multimedia functions of mobile devices are increasing, the amount of power used to drive the devices has increased, and operating times have been greatly shortened. Therefore, a need exists for a new power supply apparatus.

A fuel cell generates current by directly converting a fuel, for example, hydrogen, into electrical energy. Fuel cells have been identified as power supply apparatuses for mobile devices, because fuel cells produce energy for long periods of time, and can be more easily recharged, as compared to existing lithium ion batteries.

One type of fuel cell, which is suitable for use as the power supply apparatus for a mobile device, is a polymer electrolyte fuel cell (PEFC). Polymer electrolyte fuel cells can be classified as polymer electrolyte membrane fuel cells, proton exchange membrane fuel cells (PEMFC), and a direct methanol fuel cells (DMFC), in accordance with the kind of fuel used therein. Since the polymer electrolyte fuel cell uses a solid polymer as an electrolyte, it has no risk of corrosion or evaporation, due to the electrolyte, and can obtain a high current density per unit area. Moreover, the PEMFC has advantages of very high output, and low operating temperatures, as compared to other kinds of fuel cells. Meanwhile, the DMFC has advantages over the PEMFC, in that the DMFC directly uses a liquid-phase fuel, such as, methanol, etc., without using a fuel reformer, and has an operating temperature of less than 100° C.

The PEFC includes a membrane electrode assembly (MEA), which includes an anode electrode, a cathode electrode, and a polymer electrolyte membrane positioned between the anode electrode and the cathode electrode. The PEFC has a stack structure in which: an anode separator, including a fuel flow field, to supply fuel to the anode electrode; a cathode separator including an oxidant flow field, to supply an oxidant to the cathode electrode, and the MEA are stacked together. The anode and cathode separators can include different structures, in accordance with the structure and scheme of the fuel cell, and are referred to as bipolar plates.

A PEFC can be classified as an active-type fuel cell, or a passive-type fuel cell, in accordance with a supply scheme of the fuel and the oxidant. The active-type fuel cell has elements that actively supply the fuel to the anode and the oxidant to the cathode. The passive-type fuel cell has a structure that passively supplies the oxidant to the cathode, using ambient air. The passive-type fuel cell is commonly referred to as an air breathing fuel cell. Since the air breathing fuel cell does not include an apparatus to supply the oxidant, it is generally more compact, and operates with less noise.

However, there is a need to provide an air breathing fuel cell that is more compact, but still meets a user's needs. Further, in the air breathing fuel cell, connecting portions to electrically connect a plurality of unit cells, in series, project from a cathode current collector and an anode current collector, to the outside. As a result, the projecting portions increase the volume of the apparatus, a further insulating process is required, and manufacturing is complicated.

SUMMARY OF THE INVENTION

It is an aspect of the present invention to provide an end plate for an air breathing fuel cell stack, having an integrated cathode collector and end plate, which results in a reduced volume and a simplified assembly process.

It is another aspect of the present invention to provide an air breathing fuel cell stack including the end plate, which is compact and simplified.

According to aspects of the present invention, provided is an air breathing fuel cell stack including: a membrane electrode assembly (MEA) including an anode electrode, a cathode electrode, and an electrolyte positioned between the anode electrode and the cathode electrode; and an end plate coupled to the membrane electrode assembly. The end plate includes a collector contacting the cathode electrode.

According to aspects of the present invention, provided is an air breathing fuel cell stack including: a membrane electrode assembly including an anode electrode, a cathode electrode, and an electrolyte positioned between the anode electrode and the cathode electrode; and an anode side end plate contacting the anode electrode; and a cathode side end plate contacting the cathode electrode. The end plates each include a current collector positioned to contact the anode electrode or the cathode electrode.

According to another aspect of the present invention, there is provided an end plate for a fuel cell, the end plate contacting a membrane electrode assembly of an air breathing fuel cell stack. The end plate includes: a body having a first surface facing a cathode electrode of the fuel cell stack; a collector positioned on the first surface and contacting the cathode electrode; a connecting pad positioned on an opposing side of the isolative body; and an electrical contact connecting the current collector and the connecting pad.

In some exemplary embodiments the end plate is implemented by a substrate where a current collector, a connecting pad, and a conductive layer to form the electrical contact are arranged in a body, for example, a printed circuit board.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1A:
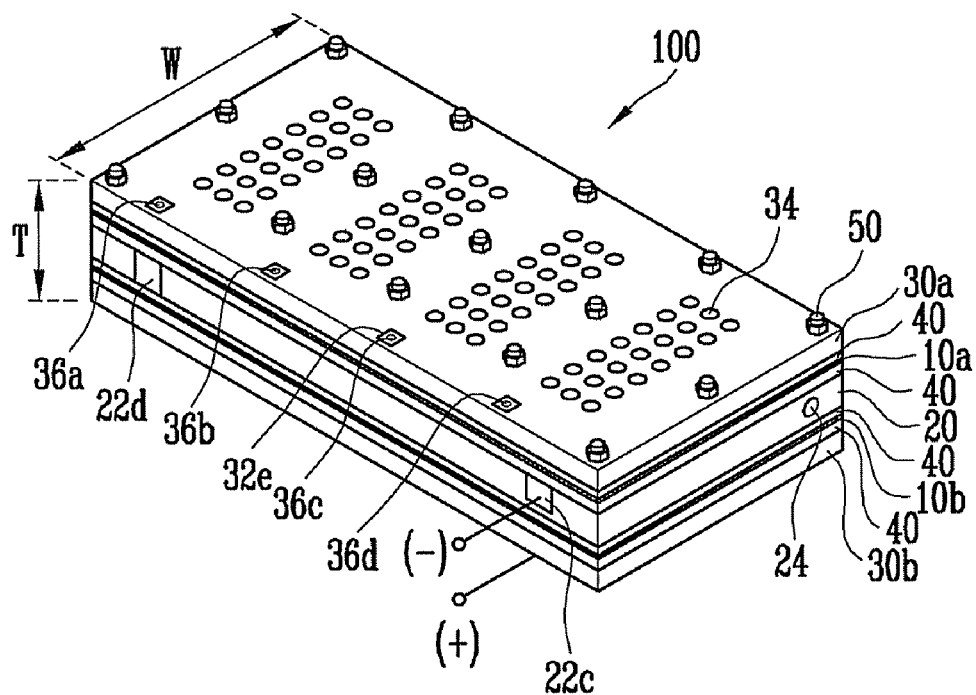
FIG. 1A is a perspective view of an air breathing fuel cell stack, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

FIG. 1A is a perspective view of an air breathing fuel cell stack 100, according to one exemplary embodiment of the present invention. Referring to FIG. 1A, the air breathing fuel cell stack 100 includes membrane electrode assemblies 10a and 10b, a middle plate 20, end plates 30a and 30b, and gaskets 40. The fuel cell stack 100 integrates an anode current collector, which contacts an anode electrode, with the middle plate 20, and integrates a cathode current collector, which contacts a cathode electrode, with the end plate 30a or 30b, in order to reduce the width W and thickness T of the stack, and to simplify the assembly process of the stack.

For reference, related art anode or cathode current collectors usually contact the anode electrode or the cathode electrode, collect electricity generated from each electrode, and include connecting terminals that project outside. Accordingly, the related art air breathing fuel cell stack has an increased volume, due to the projection of the connecting terminals. In addition, the projected connecting terminals are connected through a wire, which complicates the assembly of the related art fuel cell stacks.

The end plates 30a and 30b include a current collector and a connecting pad, connected by a conductive layer, all of which are disposed upon a isolative body configured of one or more non-conductive substrates. The middle plate 20 includes a manifold to channel fuel, having a similar structure to the end plates 30a and 30b.

The middle plate 20 and the end plates 30a and 30b can be constructed by forming the conductive layer on a thin flat substrate made of an insulator, such as, an epoxy resin, a BAKELITE resin (phenol formaldehyde), etc. The substrate can be similar to a printed circuit board (PCB).

Figure 1B:
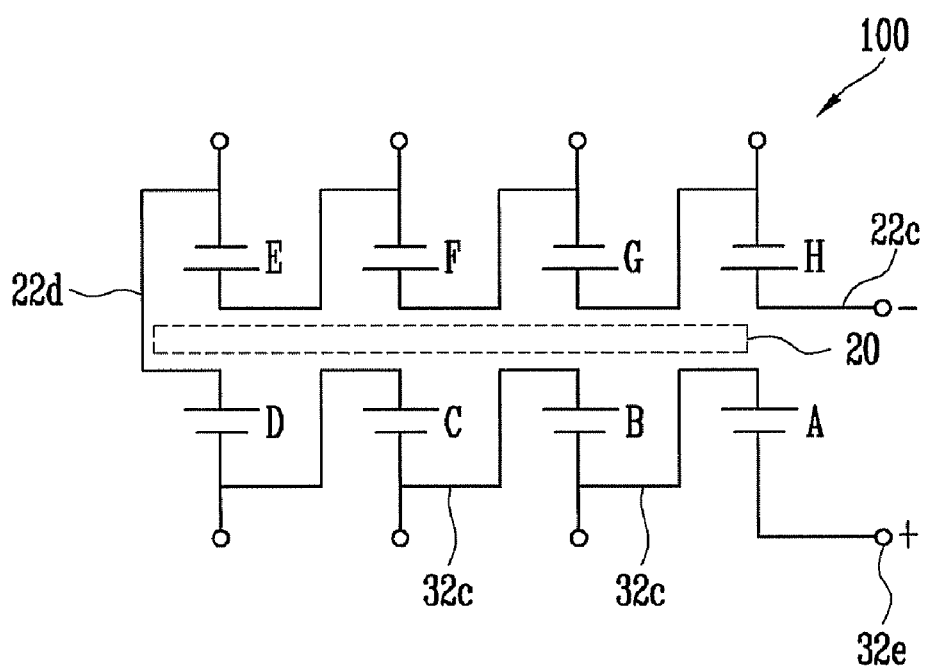
FIG. 1B is a circuit view of the air breathing fuel cell stack of FIG. 1A.

FIG. 1B is a circuit view of the fuel cell stack 100. Referring to FIG. 1B, the air breathing fuel cell stack 100 comprises eight unit cells A to H connected electrically in series.

Figure 2:
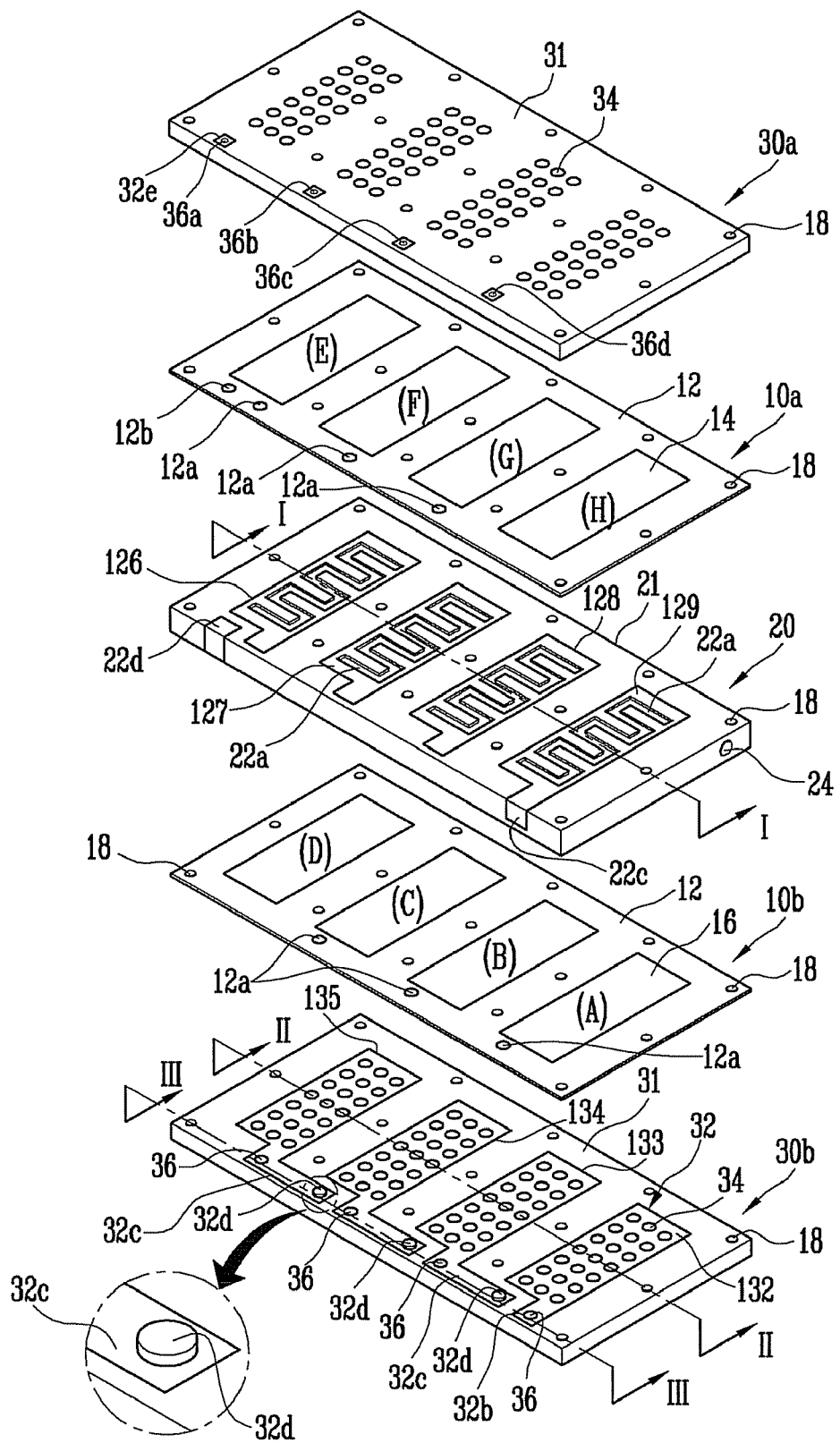
FIG. 2 is an exploded perspective view of the fuel cell stack of FIG. 1A.
Figure 3A:
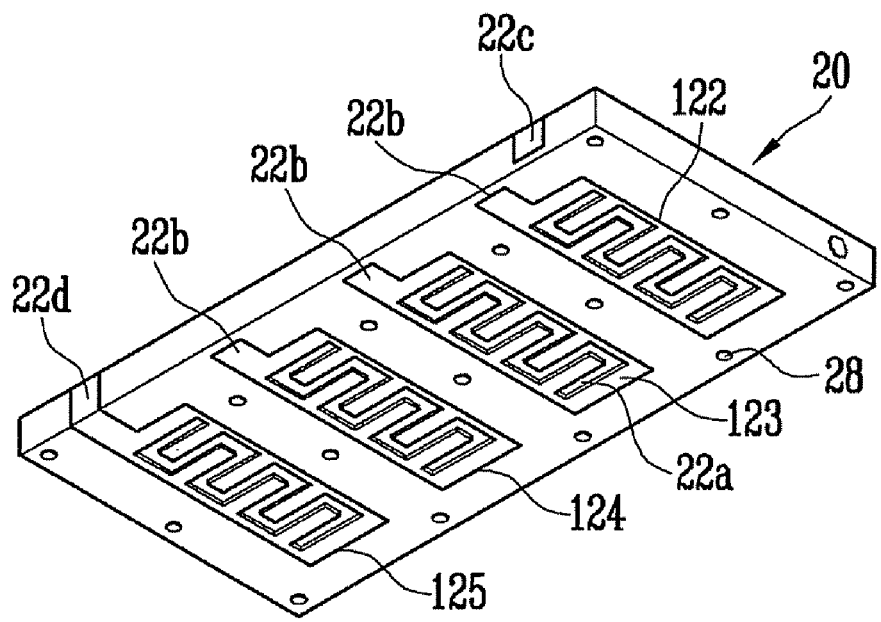
FIG. 3A is a perspective view showing a middle plate of the fuel cell stack of FIG. 2, viewed from the bottom.
Figure 3B:
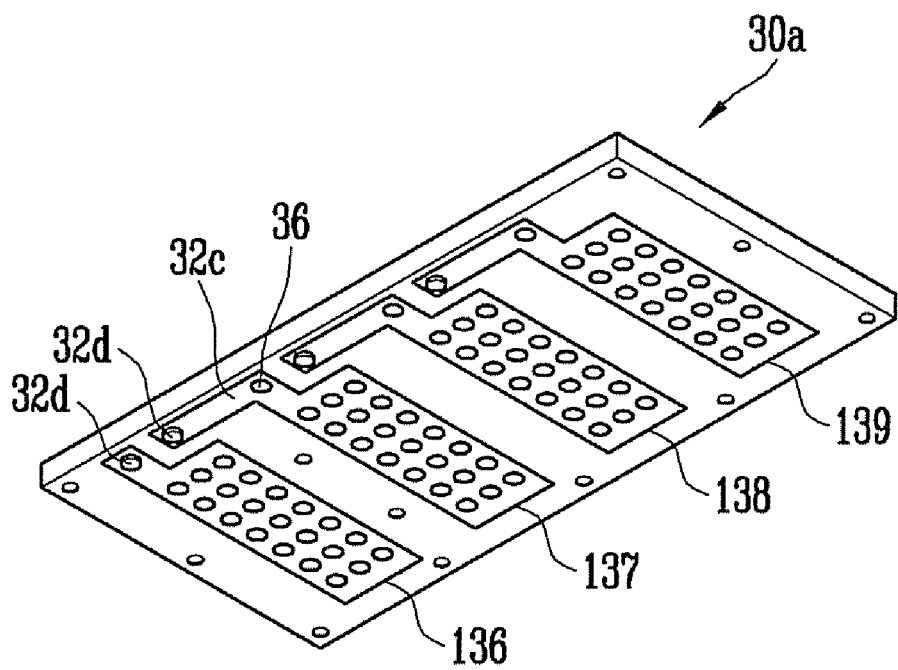
FIG. 3B is a perspective view showing a upper end plate of the fuel cell stack of FIG. 2, viewed from the bottom.

FIG. 2 is an exploded perspective view of the fuel cell stack 100. FIG. 3A is a perspective view showing the bottom of the middle plate 20 of the fuel cell stack 100 and FIG. 3B is a perspective view showing the bottom of the end plate 30a. In the fuel cell stack 100, the gaskets 40 are omitted in FIG. 2, and FIGS. 4A to 4C omit connecting holes 18, for convenience for illustration. Each component in the fuel cell stack 100 is described with reference to FIGS. 2, 3A, 3B, and 4A to 4C.

Membrane Electrode Assembly

The membrane electrode assemblies (MEAs) 10a and 10b include electrolyte membranes 12, cathode electrodes 14, and anode electrodes 16. The anode electrodes 16 are positioned on inner surfaces of the MEAs 10a and 10b, which face the middle plate 20. The cathode electrodes 14 are positioned on outer surfaces of the MEAs 10a and 10b, which face the corresponding end plates 30a and 30b adjacent thereto.

The electrolyte membrane 12 is an ion exchanging layer that is selectively permeable to protons generated by a catalyst layer of the anode electrode 16. The protons move from the anode electrode 16, through the membrane 12, to a catalyst layer of the cathode electrode 14. The electrolyte membrane 12 can include a solid polymer having the thickness of 50 to 200 µm, for example, a proton conductive polymer. Examples of suitable proton conductive polymers include a fluorine polymer, a ketonic polymer, a benzimidazolic polymer, an esteric polymer, an amide-based polymer, an imide-based polymer, a sulfonic polymer, a styrenic polymer, a hydrocarbonaceous polymer, etc. The proton conductive polymer may include poly(perfluorosulfonic acid), poly(perfluorocarboxylic acid), a copolymer of fluorovinylether and tetrafluoroethylene including sulfonic acid group, defluorinated sulfide polyetherketon, aryl keton, poly(2,2'-(m-phenylene)-5,5'-bibenzimidazole), (poly(2,2'-(m-phenylene)-5, 5'-bibenzimidazole)), poly(2,5-benzimidazole), polyimide, polysulfon, polystyrene, polyphenylene, etc. but is not limited thereto. The electrolyte membrane 13 generally has the thickness of 0.1 mm, or less, in order to effectively transmit protons.

A solvent may be used when producing the electrolyte membrane 12. Examples of the solvent include ethanol, isopropylalcohol, n-propylalcohol, butylalcohol, water, dimethylsulfoxide (DMSO), dimethylacetamide (DMAc), N-methylpyrrolidone (NMP), and combinations thereof.

Although not shown in detail, the cathode electrodes 14 may include a catalyst layer and a backing layer. Similarly, the anode electrodes 16 may include a catalyst layer and a backing layer. The backing layer can be referred to as a gas diffusion layer.

The catalyst layers of the cathodes 14 and the anodes 16 are disposed on opposing surfaces of the electrolyte membranes 12, and promote the oxidation of fuel and the reduction of oxygen. The catalyst layers of the cathodes 14 and the anodes 16 include at least one metal catalyst selected from a group consisting of platinum, ruthenium, osmium, an alloy of platinum-ruthenium, an alloy of platinum-osmium, an alloy of platinum-palladium, and an alloy of platinum-M (M is at least one transition metal selected from a group consisting of Ga, Ti, V, Cr, Mn, Fe, Co, Ni, Cu, and Zn). The metal catalyst layers can be impregnated in a carrier. Any materials with conductivity can be used as the carrier, for example, a carbon carrier can be used.

The backing layers of the cathodes 14 and the anodes 16 distribute fuel, water, air, etc.; collect electricity; and prevent loss of materials from the catalyst layers. The backing layers can include carbon based materials, such as carbon cloth, carbon paper, etc.

The membrane electrode assemblies 10a and 10b include openings 12a. The openings 12a run between current collectors of the middle plate 20 and current collectors of the end plates 30a and 30b.

The membrane electrode assembly 10a includes unit cells E-H and the membrane electrode assembly 10b includes unit cells A-D. Each of the unit cells A-H includes a cathode electrode 14, an anode electrode 16, and a portion of the electrolyte membrane 12 disposed therebetween. The membrane electrode assemblies 10a and 10b include portions of connecting holes 18, which also extend through the end plates 30a and 30b and the middle plate 20. Fasteners 50 are disposed in the connecting holes 18, and will be discussed later.

Referring to FIG. 2, the membrane electrode assembly 10a (upper MEA) and the membrane electrode assembly 10b (lower MEA) are substantially the same. However, the membrane electrode assembly 10b does not include opening 12b, which is defined in the membrane electrode assembly 10a. The opening 12b is used to serially connect unit cell D, with the unit cell E. The membrane electrode assemblies 10a and/or 10b can have different numbers of openings 12a and/or 12b, and/or the positions of the openings 12a and 12b can be altered.

Middle Plate

The middle plate 20 has a body 21, and includes current collectors 22, that is, 122, 123, 124, 125, 126, 127, 128, and 129 disposed on first and second sides of the middle plate 20. The middle plate 20 supports the membrane electrode assemblies 10a and 10b. The membrane electrode assemblies 10a and 10b of the unit cells A-H, contact adjacent ones of the current collectors 122, 123, 124, 125, 126, 127, 128, and 129. The middle plate 20 supplies a fuel to the anode electrodes 16, of the membrane electrode assemblies 10a and 10b.

The middle plate 20 has a manifold 26 (see FIG. 4A) defined therein, to distribute the fuel to the anode electrodes 16. The fuel can be a gas phase fuel, or a liquid phase fuel. The middle plate 20 includes a fuel hole 24, through which the fuel is supplied to the manifold 26. The fuel hole 24 can be connected to an external fuel tank (not shown). The middle plate 20 can have a box structure, or a stack structure, in which the manifold 26 is formed between a plurality of layers.

The body 21 of the middle plate 20 is formed of a non-conductive substrate. The substrate can include, for example, a thermoplastic resin, such as, an epoxy resin, a BAKELITE resin (phenol formaldehyde, etc; a polymer composite material, such as, plastic, etc.; a ceramic composite material; and/or a fiber reinforced polymer composite material.

The current collectors 122, 123, 124, 125, 126, 127, 128, and 129 of the middle plate 20 include conductive layers positioned adjacent to the unit cells A-H. The current collectors 122, 123, 124, 125, 126, 127, 128, and 129 define channels 22a, through which the fuel flows to the anode electrodes 16. The channels 22a can, for example, have a meandering shape.

The current collectors 122, 123, 124, 125, 126, 127, 128, and 129 are positioned to correspond with the unit cells (A, B, C, and D; and H, G, F, E), respectively. The current collectors 122, 123, 124, 126, 127, and 128 include first connecting pads 22b, which extend toward an edge of the middle plate 20. The first connecting pads 22b are electrically connected to current collectors of the end plates 30a and 30b, through the openings 12a of the electrolyte membranes 12.

The current collector 129 includes a second connecting pad 22c. The second connecting pad 22c is longer than the first connecting pads 22b, and extends along a first surface of the middle plate 20, which contacts the MEA 10a, and then partially around to a side edge of the middle plate 20. The current collector 125 includes a third connecting pad 22d that is similar to the second connecting pad 22c, except that the third connecting pad 22d extends along a second surface of the middle plate 20, which contacts the MEA 10a, completely around the side edge of the middle plate 20, and then along the first surface of the middle plate 20. The third connecting pad 22d can optionally extend through a through-hole (not shown) defined in the middle plate 30, from the second surface, to the first surface of the middle plate 20. The third connecting pad 22d can be provided with a projecting part (not shown, see a reference number 32d) for an electrical connection with a current collector 136 of the end plate 30a.

The current collectors 122, 123, 124, 125, 126, 127, 128, and 129 can include graphite, carbon, a metal with a corrosion-resistant surface coating, or corrosion-resistant alloy. For example, the current collectors 122, 123, 124, 125, 126, 127, 128, and 129 can be formed of aluminum, titanium, nickel, stainless steel, or a combination thereof.

The end plates 30a and 30b (cathode plates) have bodies 31, and include collectors 32, that is, current collectors 132, 133, 134, 135, 136, 137, 138, and 139, disposed on inner surfaces thereof, which face the middle plate 20. The end plates 30a and 30b contact and support the membrane electrode assemblies 10a and 10b. The end plates 30a and 30b have similar constructions, so only one of the end plates 30a and 30b will be described in detail.

The end plate 30b includes air holes 34, through which ambient air flows to the cathode electrodes 14. The air holes 34 are grouped together adjacent to the unit cells A-D. The air holes 34 can have various sizes, shapes, and/or numbers, according to the size of the fuel cell stack 100 or the unit cells A-D.

The body 31 of the end plate 30b can include a non-conductive material, similar to the material used to form the middle plate 20. The body 31 can include an insulator used in a printed circuit board, for example, polycarbonate, polyethylene terephthalate, polyetersulfon, polyimide, polyethylene naphthalate, or a combination thereof. According to some exemplary embodiments, the body 31 can include paper, glass fiber, phenolic resin, epoxy-based resin, polyimide, polyester, ceramic, or a combination thereof, in addition to, or instead of the previously recited materials.

Figure 4A:
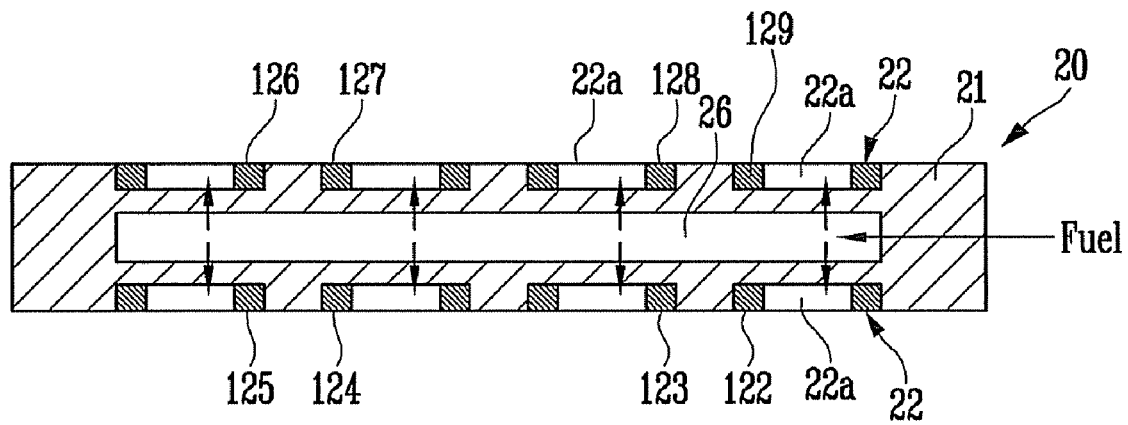
FIG. 4A is a cross-sectional view taken along line I-I of the middle plate of FIG. 2.
Figure 4B:
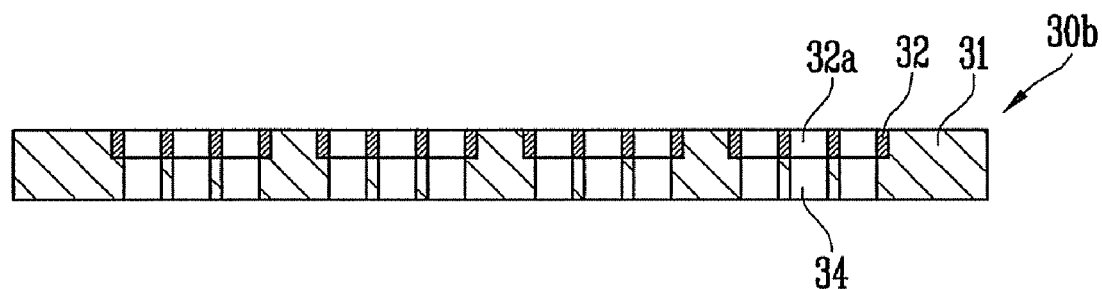
FIG. 4B is a cross-sectional view taken along line II-II of the cathode end plate of FIG. 2.
Figure 4C:
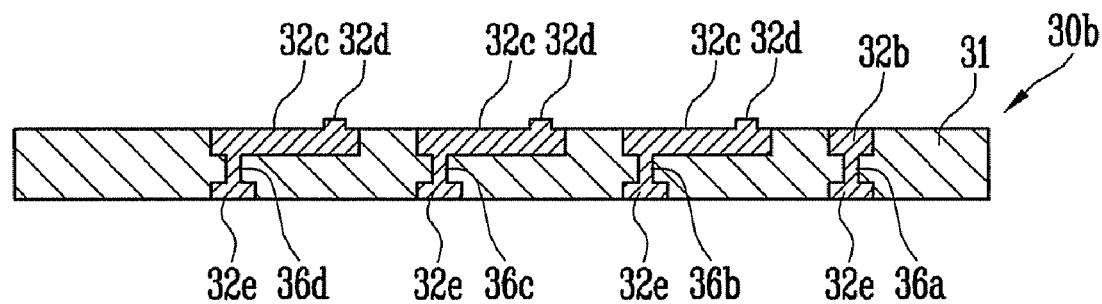
FIG. 4C is a cross-sectional view taken along line III-III of the cathode end plate of FIG. 2.

The current collectors 132, 133, 134, and 135 of the end plate 30b can be formed of conductive layers, positioned as shown in FIGS. 4B and 4C. The air holes 34 extend through the end plate 30b and the current collectors 132, 133, 134, and 135.

The current collectors 132, 133, 134, and 135 include second pads 32e, which are disposed on an outer surface of the end plate 30, which faces away from the middle plate 20. The current collector 132 includes the first connecting pad 32b disposed on the inner surface of the end plate 30, which faces the middle plate 20. The first connecting pad 32b, of the current collector 132, extends through a through-hole 36, such that the first connecting pad 32b and the associated second connecting pad 32e are physically connected.

The current collectors 133, 134, and 135 include connecting layers 32c, which are disposed on the inner surface of the end plate 30b. The connecting layers 32c extend along a long axis of the end plate 30b. The connecting layers 32c include terminals 32d. The terminals 32d contact the first connecting pads 22b of the current collectors 122 to 125 of the middle plate 20, through the openings 12a, such that the adjacent unit cells, for example, unit cells A-D, are connected in series. The current collectors extend through the associated through holes 36, such that the second pads 32e and the connecting layers 32c are electrically connected.

The current collectors 132, 133, 134, and 135 of the end plate 30b can be formed by coating a conductive material onto the end plate 30, or by inserting a solid conductive material into a groove formed in the end plate 30 on the one surface of the isolative body 31. The current collectors 132, 133, 134, and 135 can include graphite, a carbon composite, a metal composite, or the like. According to another exemplary embodiment, the current collectors 132, 133, 134, and 135 can include a metal, for example aluminum, titanium, nickel, or stainless steel. The metal can be surface coated with, for example, gold, titanium nitride, lead oxide, carbon, a conductive polymer, or the like.

Referring to FIG. 1, the air breathing fuel cell stack 100 includes gaskets 40. The gaskets 40 are positioned between the membrane electrode assemblies 10a and 10b and the middle plate 20. The gaskets 40 block the influx of outside air, and block the leakage of fuel supplied to the anode electrodes 16 from the middle plate 20. The gaskets 40 seal the diffusion layers of the anode electrodes 16, to facilitate the flow of fuel and reaction products, and seal the diffusion layers of the cathode electrodes 14, to facilitate the flow of oxidant and water.

The gaskets 40 have excellent elasticity and heat resistance. The gaskets 40 can be installed as semi-hardened gasket pads, and/or by applying a slurry material, which then hardens. The gaskets 40, can comprise, for example, ethylene propylene rubber (EPDM), silicon, silicon-based rubber, acrylic rubber, thermoplastic elastomer (TPE), and the like.

The air breathing fuel cell stack 100 includes the fasteners 50. The fasteners 50 hold the components of the stack 100 together. The fasteners 50 can be, for example, bolts penetrating through the edge of the stack 100 and nuts coupling with the end portions of the bolts, or any other suitable fastening device.

The operation principle of the air breathing fuel cell stack of the present invention will now be described. The fuel supplied from the middle plate 20 is oxidized into protons ($H^+$) and electrons ($e^-$) by the anode electrodes 16 of the membrane electrode assemblies 10a and 10b. The protons move through the electrolyte membranes 12, to the cathode electrodes 14, and the electrons move through the external load (not shown), to the cathode electrodes 14. The protons and the electrons are reacted with oxygen, at the cathode electrodes 14, which generates heat and water.

The fuel can be a hydrocarbon fuel (methanol, ethanol, and the like), sodium boron hydride ($NaBH_4$), or pure hydrogen. When using the methanol as the fuel, the electrochemical reaction of the fuel cell stack can be indicated by the following reaction equation 1:

Anode: $CH_3OH + H_2O \rightarrow CO_2 + 6H^+ + 6e^-$

Cathode: $3/2 O_2 + 6H^+ + 6e^- \rightarrow 3H_2O$

Overall: $CH_3OH + 3/2 O_2 \rightarrow CO_2 + 2H_2O$ [Reaction Equation 1]

When hydrogen or a reformed hydrogen rich gas is used, the electrochemical reaction of the fuel cell stack can be indicated by the following reaction equation 2.

Anode: $H_2(g) \rightarrow 2H^+ + 2e^-$

Cathode: $1/2 O_2 + 2H^+ + 2e^- \rightarrow H_2O$

Overall: $H_2 + 1/2 O_2 \rightarrow H_2O$ [Reaction Equation 2]

The foregoing exemplary embodiments teach a fuel cell stack with a symmetrical structure, however, the present invention is limited to such a constitution. For example, the aspects of the present invention can be implemented by a structure where a single MEA can be used. In this case, current collectors are not formed on one surface of the middle plate 20.

Also, in describing the air breathing fuel cell 100, the electrolyte membranes 12 are taught to be made of a solid polymer. However, the present invention is not limited to such a constitution, and can be applied to an air breathing fuel cell stack including an MEA that includes a liquid electrolyte. As the liquid electrolyte can be, for example, a potassium hydroxide (KOH) solution, or the like.

As described above, the aspects of the present invention relate to end plates having integrated current collectors similar to a printed circuit board, to reduce the width and thickness of the air breathing fuel cell stack. This configuration allows for a more compact stack, and does not require a separate electrical connection process. Further, the aspects of the present invention have relate to a cell voltage that can easily be monitored, using the connecting pads, which are exposed on the external surface of the stack.

Although a few exemplary embodiments of the present invention have been shown and described, it would be appreciated by those skilled in the art that changes might be made in these embodiments, without departing from the principles and spirit of the invention, the scope of which is defined in the claims and their equivalents.

What is claimed is:

1. An air breathing fuel cell stack comprising:
   a membrane electrode assembly comprising anode electrodes, cathode electrodes that are each disposed to face a corresponding one of the anode electrodes, and an electrolyte membrane positioned between the anode and cathode electrodes;
   an anode plate having an inner surface that faces the membrane electrode assembly, the anode plate comprising anode current collectors disposed on the inner surface, such that anode current collectors contact the anode electrodes; and
   two cathode plates, each having an inner surface that faces the membrane electrode assembly and an opposing outer surface, the cathode plate comprising cathode current collectors disposed on the inner surface, such that the cathode current collectors contact the cathode electrodes, wherein,
   at least one of the cathode current collectors extends through an opening defined in the electrolyte membrane and directly contacts one of the anode current collectors.

2. The air breathing fuel cell stack as claimed in claim 1, wherein:
   the anode current collectors comprise first connecting pads and first conductive layers; and
   the cathode current collectors comprise second connecting pads disposed upon the outer surface of the cathode plate, and second conductive layers that extend from ends of the cathode current collectors, along the inner surface of the cathode plate, and are connected to the second connecting pads.

3. The air breathing fuel cell stack as claimed in claim 2, wherein the second conductive layers extend through through-holes defined in the respective plates.

4. The air breathing fuel cell stack as claimed in claim 2, wherein at least one of the first conductive layers is exposed through a side of the anode plate.

5. The air breathing fuel cell stack as claimed in claim 2, wherein the cathode current collectors further comprise projecting terminals that extend from the second conductive layers, through the electrolyte membrane, and contact the first connecting pads.

6. The air breathing fuel cell stack as claimed in claim 1, wherein the anode plate has a manifold defined therein, to supply fuel to the anode electrodes.

7. The air breathing fuel cell stack as claimed in claim 6, wherein:
the fuel cell stack includes two of the membrane electrode assemblies and two of the cathode plates;
the anode plate is a middle plate disposed between the membrane electrode assemblies; and
the membrane electrode assemblies are disposed between the cathode plates.

8. The air breathing fuel cell stack as claimed in claim 6, wherein the anode current collectors have openings defined therein, through which the fuel flows from the manifold to the anode electrodes.

9. The air breathing fuel cell stack as claimed in claim 1, wherein the anode and cathode current collectors comprise graphite, a carbon composite, a metal composite, or a combination thereof.

10. The air breathing fuel cell stack as claimed in claim 1, wherein the anode and cathode current collectors comprise aluminum, titanium, nickel, stainless steel, or a combination thereof, and a coating layer coated on a surface of the current collectors.

11. The air breathing fuel cell stack as claimed in claim 10, wherein the coating layer comprises gold, titanium nitride, lead oxide, carbon, a conductive polymer, or a combination thereof.

12. The air breathing fuel cell stack as claimed in claim 1, wherein the cathode and anode plates comprise polycarbonate, polyethylene terephthalate, polyethersulfon, polyimide, polyethylene naphthalate, or a combination thereof.

13. The air breathing fuel cell stack as claimed in claim 1, wherein the cathode and anode plates comprise paper, glass fiber, phenolic resin, epoxy-based resin, polyimide, polyester, ceramic, or a combination thereof.

14. The air breathing fuel cell stack as claimed in claim 1, further comprising one or more gaskets positioned between the membrane electrode assembly and the cathode and anode plates.

15. A fuel cell stack comprising:
membrane electrode assemblies that each comprise anode electrodes, cathode electrodes that face the anode electrodes, and an electrolyte membrane positioned between the anode and cathode electrodes;
a middle plate disposed between the membrane electrode assemblies, comprising anode current collectors disposed on opposing surfaces thereof, so as to contact the anode electrodes, and first connecting pads that extend from the current collectors; and
two cathode plates, each having inner surfaces that face the membrane electrode assemblies and opposing outer surfaces, the cathode plates comprising:
cathode current collectors disposed on the inner surfaces, so as to contact the cathode electrodes;
connecting layers extending from ends of the cathode current collectors, along the inner surfaces of the cathode plates;
second connecting pads disposed on the outer surfaces and connected to the connecting layers; and
terminals that extend from the connecting layers, through openings of the electrolyte membranes, and directly contact the first connecting pads of corresponding ones of the anode current collectors.

* * * * *

UNITED STATES PATENT AND TRADEMARK OFFICE
CERTIFICATE OF CORRECTION

| | | |
|---|---|---|
| PATENT NO. | : 7,807,310 B2 | Page 1 of 1 |
| APPLICATION NO. | : 12/034060 | |
| DATED | : October 5, 2010 | |
| INVENTOR(S) | : Yeong-Chan Eun et al. | |

It is certified that error appears in the above-identified patent and that said Letters Patent is hereby corrected as shown below:

In the Claims

Column 8, Claim 3, line 67    After "respective"
                              Insert -- cathode --

Signed and Sealed this
Seventeenth Day of January, 2012

David J. Kappos
*Director of the United States Patent and Trademark Office*